Patented Nov. 7, 1944

2,362,409

UNITED STATES PATENT OFFICE 2,362,409

REAGENT FOR SOFTENING WATER AND THE FLOCCULATION OF SUSPENDED SOLIDS THEREIN

John Oswald Samuel, Swansea, Wales, assignor to Unifloc Reagents Limited, Swansea, Wales, a British company No Drawing. Application February 20, 1940, Serial No. 319,983. In Great Britain February 23, 1939

4 Claims. (Cl. 252—181)

The present invention is for improvements in or relating to water softening and for the flocculation of suspended solids in aqueous liquids and includes the flocculation of suspended solids in water softening and in the clarification of effluents and certain trade wastes.

In the softening of water, the addition of milk of lime and/or soda ash to cold hard water to precipitate out dissolved salts as carbonates possesses certain disadvantages. Thus, an excess over the theoretical quantity of reagent, or reagents, such as lime and/or soda ash has invariably to be added in order to reduce the hardness to a low figure; in the absence of heat the reaction does not usually proceed to completion; an excess of reagents gives a softened water with a high degree of alkalinity; the precipitates are in most cases difficult to remove by filtration; and there is a tendency for after-precipitation particularly with water containing appreciable quantities of magnesium salts.

It is an object of the present invention to provide a reagent which when used in conjunction with lime and/or soda ash for the softening of water minimises the above-mentioned disadvantages.

According to the present invention the process for the preparation of a reagent which when used with lime and/or soda ash facilitates the flocculation of suspended solids in aqueous liquids comprises reacting aluminum sulphate (or a mixture of sodium or potassium aluminate and sodium or potassium sulphate) and caustic soda or caustic potash and adding starch to the reaction mixture at or above room temperature but not exceeding about 140° C. This temperature is attained by the reaction of the aluminium sulphate with caustic soda or caustic potash, the reaction being carried out only with such external heating as is necessary to initiate the reaction or by the direct heating of the alkali aluminate and caustic alkali.

When the starch is added to the reaction mixture at or about room temperature the paste formed sets on standing to a comparatively hard mass which can be broken up and powdered. At temperatures between room temperature and about 110° C. the paste formed is immediately converted into a hard mass that can be broken up into powder or, if the paste is continuously stirred during the addition of starch, a powdery product is formed without the intermediate hard mass and therefore no subsequent breaking up of the product is required.

The setting of the paste may take as long as two or three hours at 30–40° C. and approximately 10 minutes at 60° C.

The aluminium sulphate may contain water of crystallization. When the anhydrous salt is used a proportion of water should be added.

The reagent made in accordance with the present invention can be added to the water to be softened together with the usual softening chemicals when it assists the softening of the water down to a low figure of hardness, for example down to one or two degrees within approximately one hour from the time of introduction of the reagent into the water. The precipitate forms immediately and assumes a flocculated form and settles rapidly, leaving a clear soft water with a low degree of alkalinity.

When in accordance with the present invention the reagent is added, preferably in the form of a dilute solution or suspension to aqueous suspensions of inter alia coal slurry, clays such as Bentonite, ganister, china clay, flue dust, vegetation, paper pulp and the like, excellent flocculation is obtained on the addition of approximately 0.25 lb. to 1.0 lb. of the reagent per 1,000 gallons of the suspension to be treated. The quantity to be added depends on the conditions. In order to obtain the best results it is important that the suspensions should be made alkaline, e. g., with lime before adding the reagent. The quantity of alkali which should be added to a suspension prior to flocculation in accordance with this invention is approximately 0.5 to 4 lbs. per 1,000 gallons. The concentration of the suspensions for flocculation is assumed to be of such an order that the flocculated particles have reasonably free falling conditions. Thus a coal slurry suspension should contain solids of the order of 5 to 10%, clay, e. g. 5% of solids, and vegetation and pulp suspensions 0.10% to 0.50% approximately.

The following specific examples illustrate the manner in which the additional reagent can be produced in accordance with the present invention.

*Example I*

40 grams of aluminium sulphate (e. g., the substance having the formula $Al_2(SO_4)_3.12H_2O$ and containing 17 to 18% alumina) are mixed with 40 grams of caustic soda (commercial quality) in a beaker. The mixture is heated for about one minute, or until a faint sizzling sound is heard, when heating is discontinued and the contents stirred. The reaction proceeds violently with the evolution of considerable heat (a temperature of 140° C., being attained) until a thick brownish product is formed which is smooth and free from lumps. This product is preferably cooled to about 30–60° C. and 18 grams of potato starch in dry form are added and intimately mixed with the paste. The mixture, which is now in a thick but fluid form, is poured into a shallow pan and allowed to set. After about ten minutes at the higher temperature the product forms a white hard cake which can be broken up and powdered. If cooled to room temperatures, i. e., 10–15° C., the reaction takes the same course but the product sets more slowly and takes from 10 to 20 hours to get hard.

Example II 40 grams of aluminium sulphate and 40 grams of caustic soda are allowed to react together as in Example I and the product then cooled to about 40° C. or lower. 28 ccs. of water are added and the mixture stirred and then 12 grams of potato starch are added and well stirred in. The mixture is heated to evaporate some of the water and is stirred continually until thickening commences which takes place when the mixture reaches a temperature of approximately 80 to 90° C. when heating is discontinued but stirring is still continued. When cool the product is in a granular and almost dry form which can, if desired, be ground to a still finer form.

Example III 40 grams of aluminium sulphate and 40 grams of caustic soda are allowed to react together as in Example I and 25 grams of starch are quickly stirred up into the hot paste at a temperature of approximately 105° C. with constant stirring. The product very shortly changes to a fairly fine powder that can be ground still finer in a suitable mill.

Example IV 11 grams of sodium aluminate, 26.5 grams of sodium sulphate, 24.5 grams of caustic soda and 25 ccs. of water are mixed together until solution is complete, heat being applied if necessary. 18 grams of starch are then added and the whole stirred until the mixture thickens when it is allowed to stand to form a product which can readily be dissolved in water. The sodium aluminate employed can be obtained by the usual methods of fusion of aluminium bauxites and caustic soda. With 17 grams of caustic soda the product sets to a moderately hard mass.

The relative proportions of the various ingredients can be varied. However, the amount of caustic soda or caustic potash should preferably be above 62% of the weight of the aluminium sulphate $Al_2(SO_4)_3 12H_2O$ (or 4.5% of the mixture of anhydrous alkali aluminate and anhydrous alkali sulphate). An increase in the quantity of caustic alkali above this limit results in an increase in the softness in texture of the product and in its ability to dissolve in water without the formation of lumps to give a concentrated solution which will flow readily, such a product may contain, e. g., 125% of the weight of $$Al_2(SO_4)_3 12H_2O$$

or 64% of the weight of the anhydrous alkali aluminate and anhydrous alkali sulphate. When the caustic alkali is used in quantities below the limit, the product tends to form a gummy paste with water which does not flow very easily so that considerable dilution with water is necessary. Again with small quantities of caustic alkali it is best to cool the reacted salts almost to room temperature before the addition of the starch in order to avoid the formation of lumps and excessive gelling. Larger quantities of caustic alkali avoid the necessity of cooling to such an extent in order to eliminate the difficulty of excessive gelling.

The starches which may be employed include potato, cassava, maize or wheat starch.

The proportion of starch governs the hardness of the product before grinding and also the flocculating power of the product. In Example 1 with 30% of starch (i. e., by weight based on the combined weight of the caustic soda and aluminium sulphate or 60% based on the alkali aluminate and alkali sulphate in Example 4) the product after setting is hard and grinds to a dry powder. With 22.5% starch in Example 1 (or 42% starch in Example 4) the product is not so hard but grinds to a satisfactory product. With 15% starch in Example 1 (or 28% starch in Example 4) the product does not set but is a moist paste and could be used in that state; the additional reagent formed in the manner indicated above, either in the dry form or in the form of a paste, dissolves in hot or cold water to form an almost clear fluid gel which has the properties of accelerating softening reactions and flocculating resultant precipitates. The products having the larger quantities of starch give better flocculation and quicker rates of settling of the precipitates.

It has been found that a dryer product and a product easier to grind can be obtained by adding approximately 1% to 10% of a soft soap, e. g., potassium soap of castor or linseed oils or approximately 0.5% to 5% of a hard soap, e. g., sodium soap of oleic or palmitic acid or di- or tri-alkali phosphate to the extent of approximately 1 to approximately 5% by weight on the reaction product. The soap or other addition is best added immediately after the reaction between the aluminium sulphate and caustic soda is complete and before the addition of the starch. In this way a product containing 22.5% of starch that normally is inclined to be soft but grinds to a satisfactory product sets to a perfectly dry powder on addition of 5 grams of castor oil soap in Examples I, II, III and IV. In a similar way a hard soap when added to the extent of say 1 to 5% gives similar products. The addition of 1 to 5% approximately of di- or tri-sodium phosphate yields similar products.

The additional reagent of the invention is of value in water softening both in hot and cold processes and in the flocculation of suspensions and clarification of effluents and the invention includes a process of carrying out such a flocculating process which comprises adding thereto lime and/or soda ash with a proportion of a reagent prepared as above described.

The amount of added reagent may be of the order of 0.1 to 0.4 lb. per 1,000 gallons of water and may amount to 2% to 8% on the weight of the calcium hydroxide or the combined weight of the calcium hydroxide and soda ash employed.

The following table indicates the results obtained by using the product of the invention in conjunction with soda ash and calcium hydroxide with four different samples of hard water:

| Water sample | Hardness in parts per 100,000 | | Reagents added in pounds per 1,000 gallons | | | Residual hardness |
|---|---|---|---|---|---|---|
| | Temporary | Permanent | Soda ash | Calcium hydroxide | Product of the invention | Parts per 100,000 |
| A | 4.6 | 9.4 | 1.8 | 1.2 | 0.2 | 2.0 |
| B | 27.0 | Nil | | 4.4 | 0.2 | 2.0 |
| C | 19.0 | 14.0 | 1.4 | 2.5 | 0.3 | 1.5 |
| D | 9.5 | 6.0 | 1.0 | 1.3 | 0.15 | 2.0 |

It will be understood that it is possible to carry out the process of flocculating and softening according to the present invention by employing a preformed mixture consisting of lime and the reagent above described.

I claim:

1. A process for the preparation of a reagent which when used in conjunction with lime and/or soda ash facilitates the softening of water and the flocculation of solids suspended therein, which process comprises reacting together substantially equal amounts by weight of aluminium sulphate ($Al_2(SO_4)_3.12H_2O$) and an alkali metal hydroxide at a temperature not exceeding 140° C., cooling the reaction mixture to 30° to 60° C. and incorporating in the reaction mixture dry starch in amount by weight substantially one-half that of the aluminium sulphate.

2. A process for the preparation of a reagent which when used in conjunction with lime and/or soda ash facilitates the softening of water and the flocculation of solids suspended therein, which process comprises reacting together aluminium sulphate and an alkali metal hydroxide, the amount of the alkali metal hydroxide being between 62 and 125% on the weight of the aluminium sulphate (calculated as $$Al_2(SO_4)_3.12H_2O)$$

and incorporating in the reaction mixture starch at a temperature up to 140° C. and in proportion substantially between 15 and 30% by weight on the combined weight of the aluminium sulphate and the alkali metal hydroxide.

3. A process for the preparation of a reagent which when used in conjunction with lime and/or soda ash facilitates the softening of water and the flocculation of solids suspended therein, which process comprises reacting together sodium aluminate, sodium sulphate and an alkali metal hydroxide, the ratio by weight of the said sodium aluminate to the said sodium sulphate being of the order of 1:2.5 and the proportion of the said alkali metal hydroxide being between 4.5 and 9% on the combined weight of the sodium aluminate and sodium sulphate and incorporating in the said reaction mixture starch at a temperature up to 140° C., the proportion of starch being between 28 and 60% on the combined weight of the alkali metal hydroxide and sodium aluminate and sodium sulphate, allowing the product to cool and set to a hard mass and grinding the said mass to powder.

4. A process for the preparation of a reagent which when used in conjunction with lime and/or soda ash facilitates the softening of water and the flocculation of solids suspended therein, which process comprises reacting together substantially equal amounts by weight of aluminium sulphate ($Al_2(SO_4)_3.12H_2O$) and an alkali metal hydroxide at a temperature not exceeding 140° C. and incorporating in the said reaction mixture starch in amount by weight substantially one-half that of the aluminium sulphate.

JOHN OSWALD SAMUEL.